(12) United States Patent
Ito (10) Patent No.: US 9,022,633 B2
(45) Date of Patent: May 5, 2015

(54) LINEAR LIGHT SOURCE DEVICE AND PLANAR LIGHT SOURCE DEVICE

(75) Inventor: Yuhki Ito, Kiyosu (JP)

(73) Assignee: Toyoda Gosei Co., Ltd., Kiyosu-Shi, Aichi-Ken (JP)

( * ) Notice: Subject to any disclaimer, the term of this patent is extended or adjusted under 35 U.S.C. 154(b) by 15 days.

(21) Appl. No.: 13/550,506

(22) Filed: Jul. 16, 2012

(65) Prior Publication Data

US 2013/0070479 A1 Mar. 21, 2013

(30) Foreign Application Priority Data

Sep. 20, 2011 (JP) .................................. 2011-205195

(51) Int. Cl.
*F21V 7/04* (2006.01)
*F21V 8/00* (2006.01)
*F21Y 103/00* (2006.01)

(52) U.S. Cl.
CPC ......... *G02B 6/0031* (2013.01); *F21Y 2103/003* (2013.01); *G02B 6/0068* (2013.01); *G02B 6/0073* (2013.01); *G02B 6/0083* (2013.01); *G02B 6/0091* (2013.01)

(58) Field of Classification Search
USPC ............................................ 362/612, 249.02
See application file for complete search history.

(56) References Cited

U.S. PATENT DOCUMENTS

| 8,562,200 | B2 | 10/2013 | Park |
| 2004/0046242 | A1 | 3/2004 | Asakawa |
| 2005/0277216 | A1 | 12/2005 | Asakawa |
| 2007/0109792 | A1* | 5/2007 | Chosa et al. .................. 362/341 |
| 2008/0304288 | A1 | 12/2008 | Iwasaki |
| 2010/0149783 | A1* | 6/2010 | Takenaka et al. ............... 362/84 |
| 2010/0290248 | A1 | 11/2010 | Park |
| 2011/0181809 | A1 | 7/2011 | Sekiguchi et al. |
| 2012/0293727 | A1 | 11/2012 | Yoshikawa |

FOREIGN PATENT DOCUMENTS

| CN | 1492521 A | 4/2004 |
| CN | 1846318 A | 10/2006 |

(Continued)

OTHER PUBLICATIONS

Japanese Notification of Reasons for Refusal dated Jan. 21, 2014, with English translation.

(Continued)

*Primary Examiner* — Sean Gramling
(74) *Attorney, Agent, or Firm* — McGinn IP Law Group, PLLC (57) ABSTRACT

A linear light source device comprises a wiring substrate in a rectangular shape and a wiring pattern formed thereon, a plurality of light emitting elements arranged on the wiring substrate in a longitudinal direction of the wiring substrate and connected with the wiring pattern on the wiring substrate, reflectors, each of which includes two parts having slope surfaces on one side and the other side facing each other in the longitudinal direction of each light emitting element, and which are separated from each other on the wiring substrate corresponding to the light emitting elements, respectively; and a sealing resin sealing the light emitting elements by burying a recession portion defined by a surface of the wiring substrate where the light emitting elements are arranged and the two slope surfaces, wherein the two parts of each of reflectors have convex portions on their upper surfaces, respectively.

18 Claims, 5 Drawing Sheets

(56) References Cited

FOREIGN PATENT DOCUMENTS

| | | |
|---|---|---|
| CN | 101887890 A | 11/2010 |
| JP | 2000-138397 A | 5/2000 |
| JP | 2004-235139 A | 8/2004 |
| JP | 2004-363537 A | 12/2004 |
| JP | 2006-066328 A | 3/2006 |
| JP | 2006-120691 A | 5/2006 |
| JP | 2011-150264 A | 8/2011 |
| WO | WO 2011/089805 A1 | 7/2011 |

OTHER PUBLICATIONS

Chinese Office Action dated May 30, 2014 with an English Translation.

* cited by examiner

LINEAR LIGHT SOURCE DEVICE AND PLANAR LIGHT SOURCE DEVICE

BACKGROUND OF THE INVENTION

1. Field of the Invention

The present invention relates to a light source device having a plurality of light emitting elements arranged in a linear configuration, and arranged on the side surface of a light guiding plate for making a planar light source device. Also, the present invention relates to a planar light source device.

2. Description of the Related Art

There is a planar light emission light source having a light guiding plate and a linear light source device arranged on the side surface of the light guiding plate (for example, see Patent Reference 1) as the backlight light source of the liquid crystal display panel for use in cell phones or digital cameras, etc.

The linear light source device includes a printed circuit board having a slender rectangular-shaped wiring pattern formed thereon, light emitting elements arranged in plurality separated from each other along the longitudinal direction of the printed circuit board on the printed circuit board and connected with the wiring pattern of the printed circuit board, reflectors having a slope surface arranged on one side and the other side in the longitudinal direction of the various light emitting elements, respectively, and a sealing resin for sealing the various light emitting elements.

For the linear light source device, when thermosetting is carried out for the sealing resin, the linear light source device wraps convex downward (in the direction to the surface on the side opposite to the surface of the printed circuit board where the light emitting elements are assembled). As a result, close contact property on the light guiding plate degrades, and the light incidence efficiency to the light guiding plate decreases.

In the prior art, a linear light source device is arranged so that it is pressed on the light guiding plate, and such pressing corrects the warp of the linear light source device.

According to Patent Reference 2, the reflector arranged for a light emitting element and the reflector arranged for the adjacent light emitting element are not arranged continuously in order to prevent warp of the linear light source device. Instead, they are separated from each other by arranging a groove. The groove can relax the stress generated due to contradiction of the sealing resin, and it can prevent warp.

According to Patent Reference 3, for the LED package having LEDs, and a substrate having a recession accommodating the LEDs, a convex portion is arranged on the upper surface of the substrate. By arranging such convex portion, when the LED package is arranged on the side surface of the light guiding plate, it is possible to carry out positioning at a high precision.

Patent Reference 1: JP-A-2004-235139
Patent Reference 2: JP-A-2006-120691
Patent Reference 3: JP-A-2004-363537

However, when the linear light source device is arranged so that it is pressed on the light guiding plate to correct the warp of the linear light source device, there is a problem that the light guiding plate degrades due to the heat generated by the linear light source device. Also, the method described in Patent Reference 2 has insufficient effect in preventing warp.

The LED package described in Patent Reference 3 is not a linear light source device, and the convex portion arranged on the upper surface of the substrate cannot solve the problem.

SUMMARY OF THE INVENTION

The object of the present invention is to solve the problems of the prior art by providing a linear light source device that can be used to form the planar light source device free of degradation in the light guiding plate. As another object, the present invention provides a planar light source device with the linear light source device combined with a light guiding plate, and it is possible to suppress degradation in the light guiding plate.

The first aspect relates to a linear light source device including a wiring substrate in a rectangular shape and having a wiring pattern formed on it, a plurality of light emitting elements arranged on the wiring substrate in the longitudinal direction of the wiring substrate and connected with the wiring pattern on the wiring substrate, reflectors, each of which includes two parts having slope surfaces on one side and the other side facing each other in the longitudinal direction of each light emitting element, and which are arranged separated from each other on the wiring substrate corresponding to the various light emitting elements, respectively, and a sealing resin sealing the various light emitting elements by burying the recession portion defined by the surface of the wiring substrate where the light emitting elements are arranged and the two slope surfaces; and the linear light source device is arranged on the side surface of a light guiding plate; the two parts of each reflector have convex portions on their upper surfaces, respectively.

The second aspect relates to the linear light source device according to the first aspect having a spacer on the wiring substrate or at the end portion on the wiring substrate between one reflector and another reflector adjacent to the reflector, wherein the height from the surface of the wiring substrate to the apex of the convex portion is equal to the height of the spacer.

The third aspect relates to a linear light source device including a wiring substrate in a rectangular shape and having a wiring pattern formed thereon, a plurality of light emitting elements arranged on the wiring substrate in the longitudinal direction of the wiring substrate and connected with the wiring pattern on the wiring substrate, reflectors, each of which includes two parts having slope surfaces on one side and the other side facing each other in the longitudinal direction of each light emitting element, and which are arranged separated from each other on the wiring substrate corresponding to the various light emitting elements, respectively, and a sealing resin sealing the various light emitting elements by burying the recession portion defined by the surface of the wiring substrate where the light emitting elements are arranged and the two slope surfaces; and the linear light source device is arranged on the side surface of a light guiding plate to form a planar light source device, wherein there is a spacer higher than the upper surface of the reflector on the wiring substrate between one reflector and another reflector adjacent to the reflector, or at the end portion of the wiring substrate.

In the first through third aspects, the upper surface of the reflector refers to the surface nearest the light guiding plate among the surfaces of the reflector, or, in other words, the surface farthest from the wiring substrate.

According to the first and second aspects, there is no specific restriction on the shape and height of the convex portion (the distance in the direction perpendicular to the principal surface of the wiring substrate) as long as an air layer is included between the sealing resin and the light guiding plate so that they are not in contact with each other. For example, the shape of the convex portion may be the shape of dots (such as cubes, quadratic prisms, etc.) arranged as a row in the lateral direction of the wiring substrate. Also, there is no restriction on the position of the convex portion, as long as it is on the upper surface of the reflector.

According to the third aspect, there is no specific restriction on the shape of the spacer, as long as the sealing resin and the light guiding plate have an air layer included between them so that they are not in contact with each other. For example, the shape of the spacer may be the shape of dots (such as cubes, quadratic prisms, or the like) arranged as a row in the lateral direction of the wiring substrate, or in the shape of quadratic prisms extending in the lateral direction of the wiring substrate. The height of the spacer should be at least higher than the upper surface of the reflector so that the sealing resin and the light guiding plate are not in contact with each other. There is no specific restriction on the position of the spacer as long as it is on the wiring substrate between one reflector and another reflector adjacent to the reflector, or at the end portion of the wiring substrate, that is, as long as it is on [a portion of] the wiring substrate where the reflector, sealing resin and light emitting element are not arranged.

According to the second aspect, both the convex portion and the spacer on the upper surface of the reflector may be provided.

The fourth aspect relates to a planar light source device having a light guiding plate and the linear light source device as described in the first aspect through the third aspect and arranged on the side surface of the light guiding plate, wherein an air layer is included between the light guiding plate and the sealing resin of the linear light source device to separate them from each other.

According to this invention, even when a linear light source device is arranged so that it is pressed to contact the side surface of the light guiding plate for correcting the warp of the linear light source device, an air layer is still formed between the sealing resin and the light guiding plate so that the sealing resin and the light guiding plate are not in contact with each other due to the convex portion of the reflector or the spacer. Consequently, conduction of heat to the light guiding plate from the light emitting elements can be suppressed, and heat degradation of the light guiding plate can be suppressed.

DESCRIPTION OF THE PREFERRED EMBODIMENTS

Embodiments of the present invention will be explained in the following with reference to the drawings. However, the present invention is not limited to these embodiments.
(Embodiment 1)

Figure 1:
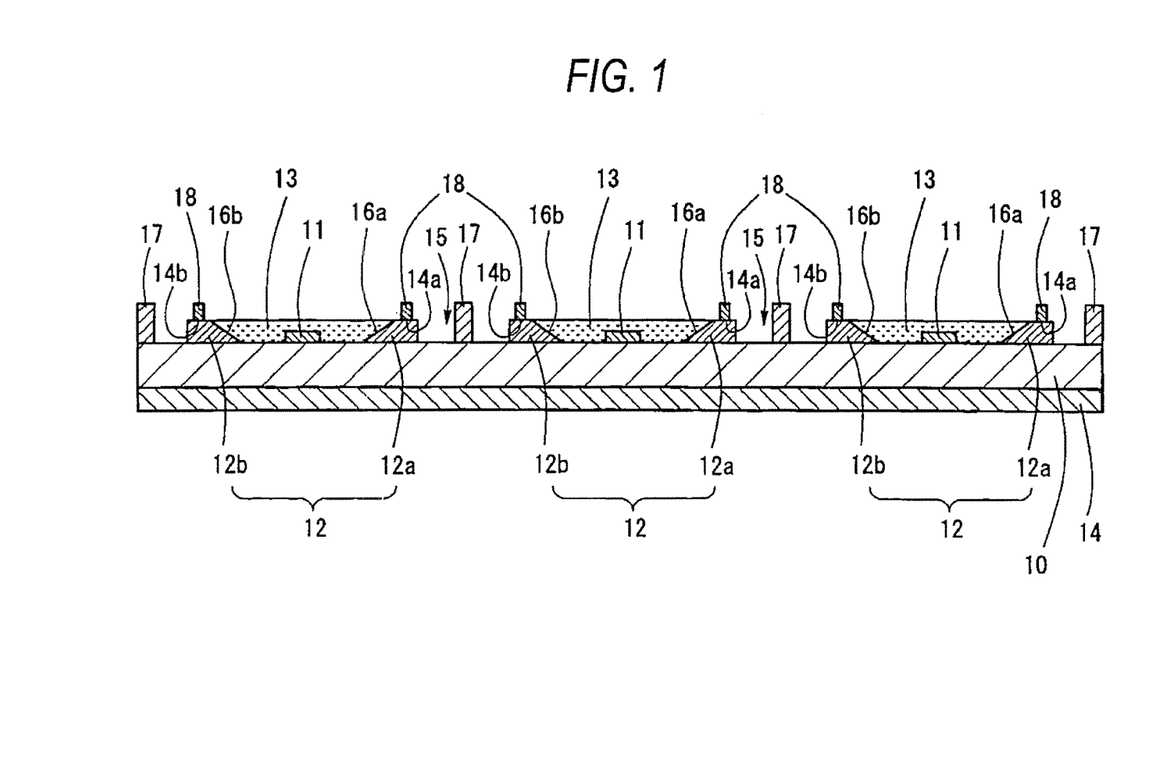
FIG. 1 is a cross-sectional view illustrating the configuration of the linear light source device in Embodiment 1.
Figure 2:
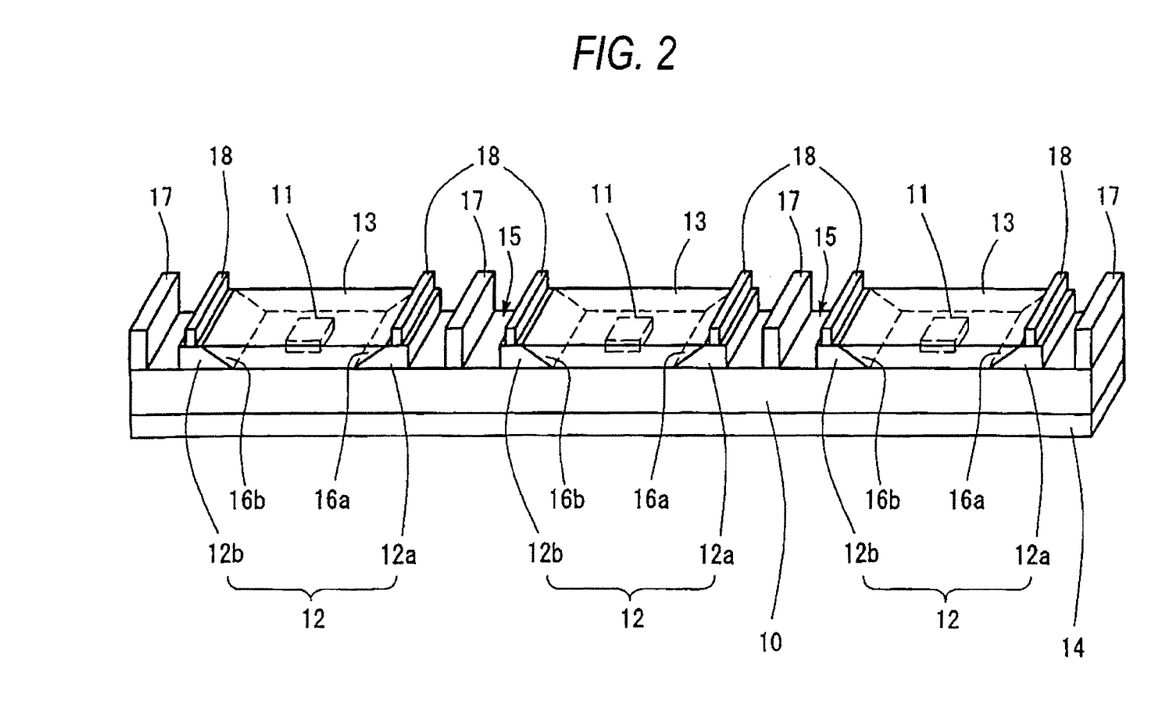
FIG. 2 is an oblique view illustrating the configuration of the linear light source device in Embodiment 1.

The linear light source device 1 of Embodiment 1 is the light source arranged on the side surface of the light guiding plate to form a planar light source device. FIG. 1 is a diagram illustrating the configuration of the linear light source device 1 of Embodiment 1. FIG. 2 is an oblique view. As shown in FIGS. 1 and 2, the linear light source device 1 in Embodiment 1 includes a wiring substrate 10 in a slender rectangular shape, light emitting elements 11 arranged in a linear configuration on the wiring substrate 10, reflectors 12 arranged on the wiring substrate 10 for each of the light emitting elements, respectively, a sealing resin 13 for sealing the light emitting elements 11, and the spacers 17.

The wiring substrate 10 is a FR-5 substrate made of glass cloth base material. One may also use the FR-4 substrate or the like. A wiring pattern is formed on the surface of the wiring substrate 10, and the wiring pattern and the light emitting elements 11 are connected with each other via bonding wires (not shown in the drawing). Here, the wiring substrate 10 has a slender rectangular shape.

The light emitting elements 11 are face-up type LEDs made of group III nitride semiconductor having blue light. The light emitting elements 11 are arranged along the longitudinal direction of the wiring substrate 10 on the wiring substrate 10. The wiring pattern of the wiring substrate 10 and the n electrodes and p electrodes (not shown in the drawing) of the light emitting elements 11 are connected with each other via bonding wires (not shown in the drawing).

In Embodiment 1, the light emitting elements 11 are face-up type light emitting elements wire bonded to the wiring substrate 10. However, one may also adopt a scheme in which the light emitting elements 11 are of the flip chip type with a structure that ensures conduction in the longitudinal direction.

The reflectors 12 are arranged on the wiring substrate 10 and separated from each other by groove 15 for each of light emitting elements 11. The reflectors 12 may be made of the following types of resin materials: polyphthalamide, liquid crystal polymer, epoxy resin, silicone resin, etc. Each of the reflectors 12 includes two parts 12a, b facing each other with a light emitting element 11 sandwiched between them in the longitudinal direction of the linear light source device 1. The parts 12a, b have slope surfaces 16a, b that are inclined with respect to the principal surface of the wiring substrate 10 on the side of the light emitting elements 11. The slope surfaces 16a, b have an inclination angle such that the light from the light emitting elements 11 is reflected upward by the slope surfaces 16a, b. As a result, the luminance of the linear light source device 1 increases, and, at the same time, it is possible to reduce the unevenness in the luminance. The top portions of reflectors 12a, b (the portions most away from the wiring substrate 10 in the direction perpendicular to the principal surface of the wiring substrate 10) are planes parallel with the principal surface of the wiring substrate 10. In the following, these surfaces will be referred to as upper surfaces 14a, b. As shown in FIG. 1, the two parts 12a, b of the reflector 12 are in the longitudinal direction of the wiring substrate 10, and the cross-section taken in the direction perpendicular to the principal surface of the wiring substrate 10 is a trapezium defined by the following edges: a lower edge as the edge that cuts the surface in contact with the wiring substrate 10, an upper edge as the edge that cuts the upper surfaces 14a, b and parallel with the lower edge, the oblique edges as the edges that cut the slope surfaces 16a, b, and edges perpendicular to the lower edge and the upper edge.

Convex portions 18 are arranged on the upper surfaces 14a, b of the reflectors 12a, b of the reflectors. Here, convex portions 18 are quadratic prisms in a slender shape extending in the lateral direction of the wiring substrate 10. The length of the convex portions 18 in the lateral direction of the wiring substrate 10 is equal to the length in the lateral direction of the wiring substrate 10. Also, the height of the convex portions 18 (the length in the direction perpendicular to the principal surface of the wiring substrate 10) is the height so that the sealing resin 13 and the light guiding plate 2 are not in contact with each other as to be explained later.

The shape of the convex portions 18 is not limited to the shape. For example, they may also dots (or cubes or quadratic prisms) arranged as a row in the lateral direction of the wiring substrate 10. Here, the larger the contact area between the convex portions 18 and the light guiding plate 2, the more stable the position of the linear light source device 1 with respect to the light guiding plate 2. Consequently, it is preferred that just as the linear light source device 1 in Embodiment 1, the shape of the convex portions 18 be slender quadratic prisms extending in the lateral direction of the wiring substrate 10, and the length of the convex portions 18 in the lateral direction of the wiring substrate 10 be equal to the length in the lateral direction of the wiring substrate 10. The material of the convex portions 18 may be different from the material for the reflectors 12. However, in consideration of simplicity of the manufacturing operation and low cost, it is preferred that the same material as that of the reflectors 12 be used, and the convex portions be formed integrated with the reflectors 12.

The sealing resin 13 is a silicone resin with yellow phosphor mixed in it. It seals the light emitting elements 11. However, one may also use epoxy resin or the like as the sealing resin 13. While sealing resin 13 can protect the light emitting elements 11 and the bonding wires, it can convert a portion of the blue light emitted from the light emitting elements 11 to yellow light, so that the blue light and yellow light are blended with each other to produce white light. Also, the sealing resin 13 is formed to fill up the recession surrounded with the slope surfaces 16a, b of the reflectors 12 and the wiring substrate 10 where the light emitting elements 11 are arranged. After the sealing resin 13 bonds the silicone resin with viscosity, it is heat treated to be cured. During the heat treatment, the silicone resin contracts, so that a stress takes place in the wiring substrate 10, leading to warp of the wiring substrate 10 which bends to a convex shape from the assembling side to the back side of the light emitting elements 11. With this stress, the linear light source device 1 warps to a convex shape towards the side of the back side of the wiring substrate 10 (the side of the surface on the side opposite to the side where the light emitting elements 11 are arranged).

Also, sealing resin 13 may be prepared by blending a reflective material for diffusing the light from the light emitting elements 11. Here, for example, the reflective material may be made of silica grains or the like.

The spacers 17 are arranged on the wiring substrate 10 as the bottom surface of the groove 15 between reflectors, or on the end portion of the wiring substrate 10. The spacers 17 have a quadratic prism shape and extend in the lateral direction of the wiring substrate 10. The length of the spacers 17 in the lateral direction of the wiring substrate 10 is equal to the length in the lateral direction of the wiring substrate 10. The height of the spacers 17 (the length of the spacers 17 in the direction perpendicular to the principal surface of the wiring substrate 10) is equal to the height from the surface of the side of the wiring substrate 10 where the light emitting elements 11 are assembled to the top portion of the convex portions 18 of the reflectors 12.

Here, there is no need to arrange the spacers 17 on the wiring substrate 10 as the bottom surface of all of the grooves 15 and on the end portion of the wiring substrate 10. For example, one may also adopt a scheme in which the spacers 17 are arranged only on the end portion of the wiring substrate 10. Here, the larger the contact area between the spacers 17 and the light guiding plate, the more stable the position of the linear light source device 1 with respect to the light guiding plate. Consequently, it is preferred that the spacers 17 be arranged on the wiring substrate 10, as the bottom surface of the groove 15 and on the end portion of the wiring substrate 10.

The shape of the spacers 17 is not limited to the shape. For example, they may also in the shape of dots (such as cubes and quadratic prisms) arranged as a row in the lateral direction of the wiring substrate 10. Here, the larger the contact area between the spacers 17 and the light guiding plate, the higher the stability of the position of the linear light source device 1 with respect to the light guiding plate, which is preferred. Consequently, as explained above, it is preferred that the shape of the spacers 17 be quadratic prism shape extending in the lateral direction of the wiring substrate 10, and it is preferred that the length of the spacers 17 in the lateral direction of the wiring substrate 10 be equal to the length of the wiring substrate 10 in the lateral direction. The material of the spacers 17 may be a material different from that of the reflectors 12. However, it is preferred that they be made of the same material as that for reflectors 12 as they can be formed integrated with the reflectors 12 so that the manufacturing operation becomes simpler and the cost can be reduced.

The operation of the linear light source device 1 will be explained in the following texts. When a current flows via the wiring pattern of the wiring substrate 10 to the light emitting elements 11, blue light is emitted in a radiating shape from the light emitting elements 11. A portion of the light is irradiated via the sealing resin 13 upward, and another portion goes through the sealing resin 13 to reach the slope surfaces 16a, b of the reflectors 12, and the light is reflected by the slope surfaces 16a, b upwards. Here, a portion of the blue light is converted to yellow light by the yellow phosphor blended in sealing resin 13. Consequently, the blue light and the yellow light are blended to generate white light. In this way, the blue light from the light emitting elements 11 is converted to white light that diffuses upward. The light also diffuses in a linear shape, as the light emitting elements 11 are arranged in linear configuration. As a result, the linear light source device 1 emits linear-shaped white light.

Figure 3:
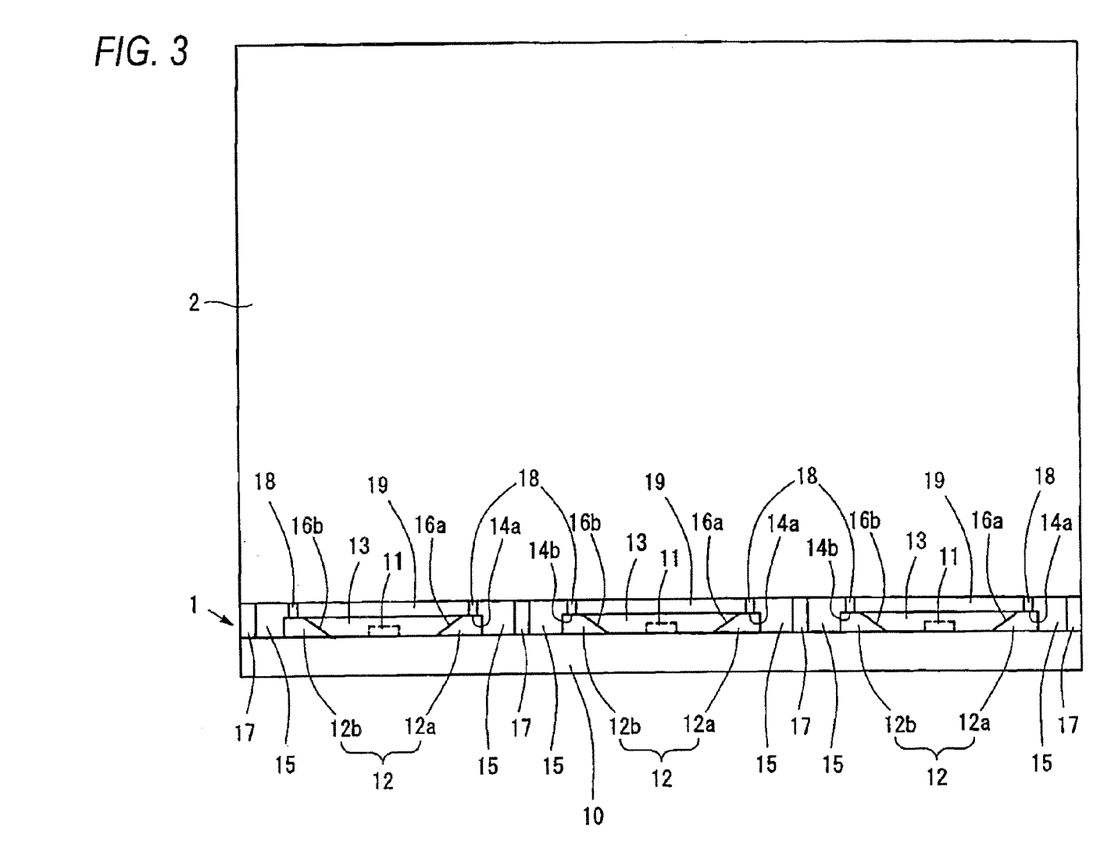
FIG. 3 is a diagram illustrating the configuration of the planar light source device.

For the linear light source device 1 in Embodiment 1, convex portions are arranged on the upper surfaces 14a, b of the reflectors 12, and spacers are arranged on the wiring substrate 10 as the bottom surface of the groove 15 between the reflectors 12. Consequently, as shown in FIG. 3, when the linear light source device 1 is pressed to correct the warp as it is arranged on the side surface of the light guiding plate 2 to form a planar light source device, an air layer 19 is formed between the sealing resin 13 of the linear light source device 1 and the light guiding plate 2, so that they are not in contact with each other. As a result, heat can hardly be transferred from the light emitting elements 11 to the light guiding plate 2, suppressing the degradation of the light guiding plate 2 by heat. Here, the thickness of the air layer 19 (the distance between the sealing resin 13 and the light guiding plate 2 in the direction perpendicular to the principal surface of the wiring substrate 10) is preferably in the range of 5 to 200 μm in order to ensure that heat transfer to the light guiding plate 2 can be suppressed efficiently. If it is thinner than 5 μm, the effect in suppressing heat transfer decreases, which is undesirable. On the other hand, if it is thicker than 200 μm, the light incidence efficiency into the light guiding plate 2 decreases, which is undesired, too. It is preferred that the height of the convex portions 18 and spacers 17 is designed to ensure that the thickness of the air layer 19 is within the range. It is more preferred that the thickness of the air layer 19 is in the range of 10 to 100 μm.

Figure 4:
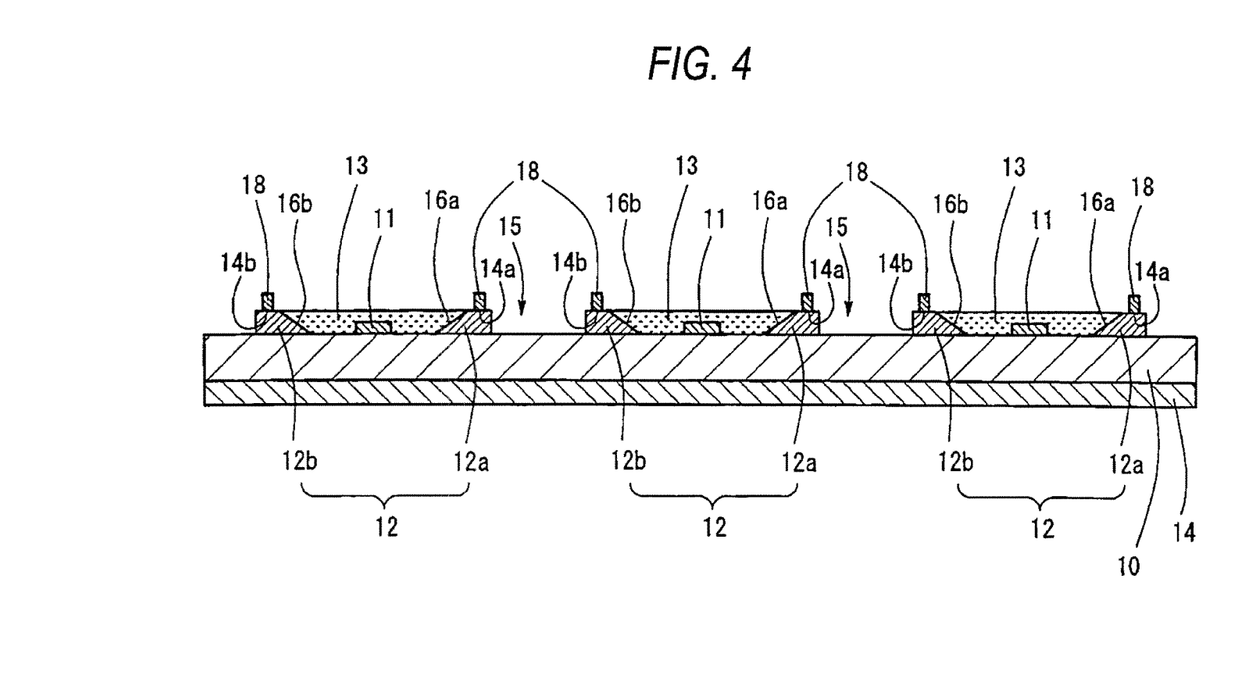
FIG. 4 is a cross-sectional view illustrating the configuration of the linear light source device in another embodiment.
Figure 5:
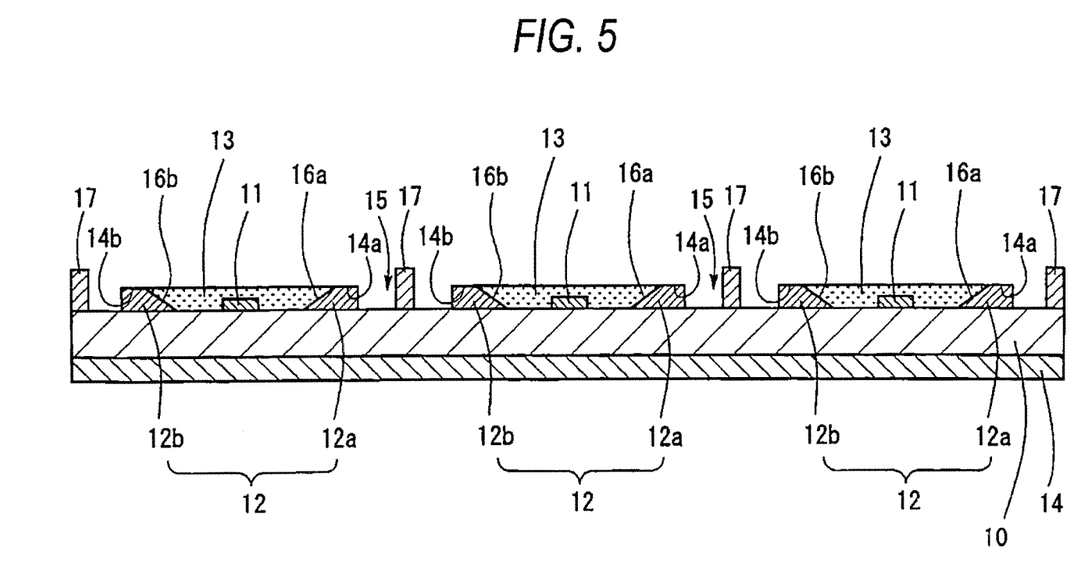
FIG. 5 is a cross-sectional view illustrating the configuration of the linear light source device in yet another embodiment.

In the linear light source device of Embodiment 1, both the convex portions 18 on the upper surface of the reflectors 12 and spacers 17 are arranged. However, one may also adopt a scheme in which only one of them is arranged. FIG. 4 is a cross-sectional view illustrating the configuration of the linear light source device when only the convex portions 18 on the upper surface of reflectors 12 are arranged, while spacers 17 are not arranged. On the other hand. FIG. 5 is a cross-sectional view illustrating the configuration of the linear light source device when only the spacers 17 are arranged, while the convex portions 18 on the upper surface of the reflectors 12 are not arranged. For both the linear light source devices shown in FIG. 4 and FIG. 5, just as the linear light source device 1 in Embodiment 1, an air layer can be formed between the sealing resin 13 and the light guiding plate 2, so that it is also possible to suppress the heat transfer to the light guiding plate 2, and it is thus possible to suppress heat degradation of the light guiding plate 2.

In the linear light source device 1 of Embodiment 1, blue light LEDs are used as the light emitting elements 11, and yellow phosphor is used as the phosphor blended in the sealing resin 13, and white light is emitted from the linear light source device 1. However, the light color of the light emitting elements 11 and the color of the phosphor are not limited to the types. For example, one may also adopt a scheme in which violet light LEDs are used as the light emitting elements, and three phosphors, that is, red phosphor, green phosphor and blue phosphor, are used as the phosphors blended in the sealing resin 13, so that the white light is emitted from the linear light source device 1.

The linear light source device of the present invention is combined with a light guiding plate to form a planar light source device that can be adopted as the backlight light source for cell phones, digital cameras, and other small size liquid crystal display panels.

What is claimed is:

1. A linear light source device that is to be arranged on a side surface of a light guiding plate, the liner light source device comprising:
   a wiring substrate in a rectangular shape and a wiring pattern formed thereon;
   a plurality of light emitting elements arranged on the wiring substrate in a longitudinal direction of the wiring substrate and connected with the wiring pattern on the wiring substrate;
   a plurality of reflectors arranged on the wiring substrate corresponding to the light emitting elements, respectively, each of which includes two parts, a first part of the two parts having a slope surface on one side which slopes downward in a first direction and a second part of the two parts having a slope surface which slopes downward in a second direction, the slope surface of the first part and the slope surface of the second part facing each other in the longitudinal direction of each light emitting element, and an upper surface of the first part which has the slope surface which slopes downward in the first direction of a first reflector of the reflectors being separated by a space from an upper surface of the second part having the slope surface which slopes downward in the second direction of a second reflector of the reflectors which is adjacent to the first part of the first reflector in the longitudinal direction; and
   a sealing resin sealing the light emitting elements by burying a recession portion defined by a surface of the wiring substrate where the light emitting elements are arranged and the two slope surfaces,
   wherein the two parts of each of reflectors have convex portions on their upper surfaces, respectively.

2. The linear light source device according to claim 1, further comprising:
   a spacer on the wiring substrate or at an end portion on the wiring substrate between one reflector and another reflector adjacent to the reflector,
   wherein the height from the surface of the wiring substrate to the apex of the convex portion is equal to the height of the spacer.

3. A planar light source device, comprising:
   a light guiding plate; and
   the linear light source device according to claim 1 and arranged on a side surface of the light guiding plate,
   wherein an air layer is included between the light guiding plate and the sealing resin of the linear light source device to separate them from each other.

4. The linear light source device according to claim 1, further comprising:
   a spacer arranged on the groove on the wiring substrate between one reflector and another reflector adjacent to the reflector,
   wherein a height from the surface of the wiring substrate to an apex of the convex portion is equal to a height of the spacer.

5. The linear light source device according to claim 1, wherein the upper surface of the first reflector and the upper surface of the second reflector are arranged parallel with the surface of the wiring substrate.

6. The linear light source device according to claim 1, wherein a length of the convex portions in a lateral direction of the wiring substrate is equal to a length of the wiring substrate in the lateral direction.

7. The linear light source device according to claim 1, wherein a material of the convex portions and a material of the reflectors comprise a same material.

8. The linear light source device according to claim 2, wherein the spacers are arranged on the wiring substrate at a bottom surface of the groove between adjacent reflectors.

9. The linear light source device according to claim 1, further comprising:
   a spacer arranged at an end portion on the wiring substrate,
   wherein a height from the surface of the wiring substrate to an apex of the convex portion is equal to a height of the spacer.

10. The linear light source device according to claim 2, wherein a length of the spacers in a lateral direction of the wiring substrate is equal to a length of the wiring substrate in the lateral direction.

11. The linear light source device according to claim 2, wherein a material of the spacer and a material of the reflectors comprise a same material.

12. The planar light source device according to claim 3, wherein a thickness of the air layer is in a range of 5 μm to 200 μm.

13. The planar light source device according to claim 12, wherein a thickness of the air layer is in a range of 10 μm to 100 μm.

14. The linear light source device according to claim 1, further comprising:
   a plurality of spacers arranged on the wiring substrate,
   wherein a spacer of the plurality of spacers is arranged on the groove on the wiring substrate between one reflector and another reflector adjacent to the reflector and a spacer of the plurality of spacers is arranged at an end portion on the wiring substrate, and
   wherein a height from the surface of the wiring substrate to an apex of the convex portion is equal to a height of the plurality of spacers.

15. A linear light source device that is to be arranged on a side surface of a light guiding plate, the linear source device comprising:

a wiring substrate in a rectangular shape and having a wiring pattern formed thereon;

a plurality of light emitting elements arranged on the wiring substrate in a longitudinal direction of the wiring substrate and connected with the wiring pattern on the wiring substrate;

a plurality of reflectors arranged on the wiring substrate corresponding to the light emitting elements, respectively, each of which includes two parts, a first part of the two parts having a slope surface on one side which slopes downward in a first direction and a second part of the two parts having a slope surface which slopes downward in a second direction, the slope surface of the first part and the slope surface of the second part facing each other in the longitudinal direction of each light emitting element, and an upper surface of the first part having the slope surface which slopes downward in the first direction of a first reflector of the reflectors being separated by a space from an upper surface of the second part having the slope surface which slopes downward in the second direction of a second reflector of the reflectors which is adjacent to the first part of the first reflector in the longitudinal direction; and a sealing resin sealing the light emitting elements by burying a recession portion defined by a surface of the wiring substrate where the light emitting elements are arranged and the two slope surfaces;

wherein a spacer higher than an upper surface of the reflector on the wiring substrate is provided between one reflector and another reflector adjacent to the reflector, or at an end portion of the wiring substrate.

16. A planar light source device, comprising:
a light guiding plate; and
the linear light source device according to claim 15 and arranged on a side surface of the light guiding plate,
wherein an air layer is included between the light guiding plate and the sealing resin of the linear light source device to separate them from each other.

17. The planar light source device according to claim 16, wherein a thickness of the air layer is in a range of 5 μm to 200 μm.

18. The planar light source device according to claim 17, wherein a thickness of the air layer is in a range of 10 μm to 100 μm.

* * * * *